United States Patent
Chen

(10) Patent No.: US 11,907,950 B2
(45) Date of Patent: *Feb. 20, 2024

(54) SYSTEM AND METHOD FOR BIOMETRIC FALLBACK AUTHENTICATION

(71) Applicant: Visa International Service Association, San Francisco, CA (US)

(72) Inventor: Yuexi Chen, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/107,631

(22) Filed: Feb. 9, 2023

(65) Prior Publication Data

US 2023/0196365 A1 Jun. 22, 2023

Related U.S. Application Data

(63) Continuation of application No. 16/965,545, filed as application No. PCT/US2019/015064 on Jan. 25, 2019, now Pat. No. 11,587,087.

(Continued)

(51) Int. Cl.
*G06Q 20/32* (2012.01)
*G06Q 20/40* (2012.01)

(52) U.S. Cl.
CPC ... *G06Q 20/40145* (2013.01); *G06Q 20/3227* (2013.01); *G06Q 20/3278* (2013.01); *G06Q 20/405* (2013.01)

(58) Field of Classification Search
CPC ......... G06Q 20/40145; G06Q 20/3227; G06Q 20/3278; G06Q 20/405
See application file for complete search history.

(56) References Cited

U.S. PATENT DOCUMENTS

| 7,337,326 B2 | 2/2008 | Palmer et al. |
| 2012/0144468 A1 | 6/2012 | Pratt et al. |

(Continued)

FOREIGN PATENT DOCUMENTS

| JP | 2006079537 A | * | 3/2006 |
| JP | 2006079537 A | | 3/2006 |

(Continued)

OTHER PUBLICATIONS

Henniger et al., "Extending EMV Payment Smart Cards with Biometric On-Card Verification", 3rd Policies and Research in Identity Management (IDMAN), Apr. 2013, pp. 121-140, London, UK, 10.1007/978-3-642-17282-7_12.hal-01470496.

(Continued)

*Primary Examiner* — Bruce I Ebersman
*Assistant Examiner* — Matthew Cobb
(74) *Attorney, Agent, or Firm* — The Webb Law Firm

(57) ABSTRACT

A method for validating user credentials in a transaction initiated with a portable payment device associated with a biometric verification process including establishing a communication protocol between the portable payment device and the point-of-sale system, determining at least one result corresponding to a verification requirement of the biometric verification process, in response to determining an absence result or a failure result of the verification requirement of the biometric verification process, determining an alternate verification process associated with the portable payment device, determining a verification requirement of the alternate verification process, and transmitting the verification requirement of the alternate verification process to the point-of-sale system. A system and computer program product for validating user credentials in a transaction are also disclosed.

14 Claims, 4 Drawing Sheets

Related U.S. Application Data

(60) Provisional application No. 62/623,766, filed on Jan. 30, 2018.

(56) References Cited

U.S. PATENT DOCUMENTS

| | | | |
|---|---|---|---|
| 2013/0103511 A1 | 4/2013 | Fisher | |
| 2015/0302413 A1 | 10/2015 | Dua | |
| 2016/0283603 A1* | 9/2016 | Langley | G06F 16/955 |
| 2017/0046714 A1 | 2/2017 | Van de Velde et al. | |
| 2017/0357790 A1* | 12/2017 | Robinson | H04W 12/02 |
| 2018/0268408 A1* | 9/2018 | Botros | G06Q 20/356 |
| 2019/0018942 A1* | 1/2019 | Takada | G06F 21/32 |

FOREIGN PATENT DOCUMENTS

| | | | |
|---|---|---|---|
| JP | 2008158627 A * | 7/2008 | |
| JP | 2008158627 A | 7/2008 | |

OTHER PUBLICATIONS

Lomas, "MasterCard trials biometric bankcard with embedded fingerprint reader", Apr. 20, 2017, 7 pages, retrieved from https://techcrunch.com/2017/04/20/mastercard-trials-biometric-bankcard-with-embedded-fingerprint-reader/.

* cited by examiner

SYSTEM AND METHOD FOR BIOMETRIC FALLBACK AUTHENTICATION

CROSS REFERENCE TO RELATED APPLICATIONS

This application is a continuation application of U.S. application Ser. No. 16/965,545, filed Jan. 25, 2019, which is the United States national phase of International Application No. PCT/US2019/015064 filed Jan. 25, 2019, and claims the benefit of U.S. Provisional Patent Application No. 62/623,766, filed on Jan. 30, 2018, the disclosures of which are hereby incorporated by reference in their entireties.

BACKGROUND OF THE DISCLOSURE

Field of the Disclosure

The present disclosure relates to payment and transactional systems, and in some non-limiting embodiments or aspects, a computer-implemented method, system, and computer program product for validating user credentials in a transaction at a point-of-sale system initiated with a portable payment device associated with a biometric verification process.

Description of Related Art

In today's economy, consumers commonly carry multiple portable payment devices (e.g., credit cards and/or debit cards) in order to initiate transactions with merchants accepting such forms of payment. Most users, e.g., cardholders, have multiple portable payment devices in their possession, whether stored in their wallets, provisioned into their devices, e.g., tokens and/or e-wallets, or lodged with payment providers. For example, on average in the United States, most users have more than three portable payment devices in their possession.

With the increase in consumers' use of portable payment devices, more and more consumer devices with payment features are now equipped with on-device biometric capabilities, such as fingerprint sensors, that replace the need to enter PINs or user account information to engage in and complete transactions with their portable payment devices. Recently, credit cards and debit cards also include biometric capabilities, such as a fingerprint sensor, for engaging in and completing transactions with a transaction terminal. Often biometric verification on the consumer's portable payment device may fail, however, due to a wrong finger being used on the fingerprint sensor, the finger being incorrectly positioned on the fingerprint sensor, an injury to the finger causing the fingerprint sensor to misread the fingerprint, the fingerprint sensor being dirty, and/or a false rejection from the biometric match algorithm being issued. Occasionally, the consumer is not notified of the biometric verification failure status and becomes frustrated as to why the payment feature on his/her portable payment device is not working. Therefore, when the biometric verification fails on the portable payment device, the consumer cannot use the portable payment device to complete a transaction, since the design of the on-device verification is "gated" or in an "on/off" position. This "gated" or "on/off" biometric verification method leads to the payment feature on the portable payment device being held in an "off" position when the biometric verification fails.

Therefore, there is a need in the art for an improved way of providing alternate biometric verification methods for portable payment devices to improve a consumer's ability to provide biometric verification to initiate and complete a payment transaction.

SUMMARY OF THE DISCLOSURE

According to some non-limiting embodiments or aspects, provided is a method for validating user credentials in a transaction at a point-of-sale system initiated with a portable payment device associated with a biometric verification process, the method comprising: establishing a communication protocol between the portable payment device and the point-of-sale system; determining, with at least one processor, at least one result corresponding to a verification requirement of the biometric verification process; in response to determining an absence result or a failure result of the verification requirement of the biometric verification process, determining, with at least one processor, an alternate verification process associated with the portable payment device; determining, with at least one processor, a verification requirement of the alternate verification process; and transmitting the verification requirement of the alternate verification process to the point-of-sale system.

In some non-limiting embodiments or aspects, the method further comprises, prior to establishing the communication protocol and prior to determining the at least one result corresponding to the verification requirement of the biometric verification process, activating a Near Field Communication (NFC) device independent of determining the at least one result corresponding to the verification requirement of the biometric verification process. The method further comprises, after activating the NFC device and prior to determining the at least one result corresponding to the verification requirement of the biometric verification process, automatically establishing, via the NFC device, an NFC link corresponding to the communication protocol between the portable payment device and the point-of-sale system. The biometric verification process comprises at least one verification requirement comprising at least one of the following: facial recognition, retina recognition, fingerprint recognition, voice recognition, or any combination thereof. The verification requirement of the alternate verification process comprises at least one of the following: user signature, issuer contact, alternate identification, a personal identification number, or any combination thereof.

In some non-limiting embodiments or aspects, the method further comprises: in response to determining a success result of the verification requirement of the biometric verification process, determining, with at least one processor, at least one transaction limitation parameter; determining, with at least one processor, transaction data corresponding to the transaction; and based upon the transaction data, and in response to determining that the at least one transaction limitation has been met, terminating, with at least one processor, the biometric verification process. The at least one transaction limitation comprises at least one of the following: a maximum transaction amount, a transaction count, cumulative transaction amount, a specified merchant limitation, a merchant category limitation, or any combination thereof. Prior to determining the alternate verification process, the method comprises reinitiating, with at least one processor, the biometric verification process.

In some non-limiting embodiments or aspects, provided is a portable payment device for use in a transaction at a point-of-sale system, comprising: at least one biometric sensor programmed or configured to determine biometric data; and at least one processor programmed or configured to: establish a communication protocol between the portable payment device and the point-of-sale system; based at least partially on the biometric data, determine at least one result corresponding to a verification requirement of the biometric verification process; in response to determining an absence result or a failure result of the verification requirement of the biometric verification process, determine an alternate verification process associated with the portable payment device; determine a verification requirement of the alternate verification process; and transmit the verification requirement of the alternate verification process to the point-of-sale system.

In some non-limiting embodiments or aspects, the portable payment device comprises at least one of the following: a portable electronic device, a mobile device, a financial instrument, a credit card, a debit card, a smart card, a prepaid card, or any combination thereof. In some non-limiting embodiments or aspects, the portable payment device further comprises a Near Field Communication (NFC) device. Prior to establishing the communication protocol and prior to determining the at least one result corresponding to the verification requirement of the biometric verification process, the NFC device is activated independent of determining the at least one result corresponding to the verification requirement of the biometric verification process. After activating the NFC device and prior to determining the at least one result corresponding to the verification requirement of the biometric verification process, an NFC link corresponding to the communication protocol between the portable payment device and the point-of-sale system is automatically established via the NFC device. The biometric sensor comprises at least one of the following: a camera, a fingerprint sensor, a microphone, or any combination thereof. The verification requirement of the alternate verification process comprises at least one of the following: user signature, issuer contact, alternate identification, a personal identification number, or any combination thereof. The at least one processor is further programmed or configured to: in response to determining a success result of the verification requirement of the biometric verification process, determine at least one transaction limitation parameter; determine transaction data corresponding to the transaction; and based upon the transaction data, and in response to determining that the at least one transaction limitation has been met, terminate the biometric verification process. Prior to determining the alternate verification process, the at least one processor is programmed or configured to reinitiate the biometric verification process.

In some non-limiting embodiments and aspects, provided is a computer program product for validating user credentials in a transaction at a point-of-sale system initiated with a portable payment device associated with a biometric verification process, comprising at least one non-transitory computer-readable medium including program instructions that, when executed by at least one processor, cause the at least one processor to: establish a communication protocol between the portable payment device and the point-of-sale system; based at least partially on biometric data, determine at least one result corresponding to a verification requirement of the biometric verification process; in response to determining an absence result or a failure result of the verification requirement of the biometric verification process, determine an alternate verification process associated with the portable payment device; determine a verification requirement of the alternate verification process; and transmit the verification requirement of the alternate verification process to the point-of-sale system.

In some non-limiting embodiments or aspects, the program instructions further comprise, prior to establishing the communication protocol and prior to determining the at least one result corresponding to the verification requirement of the biometric verification process, activating a Near Field Communication (NFC) device independent of determining the at least one result corresponding to the verification requirement of the biometric verification process. The program instructions further comprise, after activating the NFC device and prior to determining the at least one result corresponding to the verification requirement of the biometric verification process, automatically establishing, via the NFC device, an NFC link corresponding to the communication protocol between the portable payment device and the point-of-sale system. The biometric verification process comprises at least one verification requirement comprising at least one of the following: facial recognition, retina recognition, fingerprint recognition, voice recognition, or any combination thereof. The verification requirement of the alternate verification process comprises at least one of the following: user signature, issuer contact, alternate identification, a personal identification number, or any combination thereof. The program instructions cause the at least one processor to: in response to determining a success result of the verification requirement of the biometric verification process, determine at least one transaction limitation parameter; determine transaction data corresponding to the transaction; and based upon the transaction data, and in response to determining that the at least one transaction limitation has been met, terminate the biometric verification process. Prior to determining the alternate verification process, the program instructions cause the at least one processor to reinitiate, with at least one processor, the biometric verification process.

Further non-limiting embodiments or aspects are set forth in the following numbered clauses:

Clause 1: A method for validating user credentials in a transaction at a point-of-sale system initiated with a portable payment device associated with a biometric verification process, the method comprising: establishing a communication protocol between the portable payment device and the point-of-sale system; determining, with at least one processor, at least one result corresponding to a verification requirement of the biometric verification process; in response to determining an absence result or a failure result of the verification requirement of the biometric verification process, determining, with at least one processor, an alternate verification process associated with the portable payment device; determining, with at least one processor, a verification requirement of the alternate verification process; and transmitting the verification requirement of the alternate verification process to the point-of-sale system.

Clause 2: The method of Clause 1, further comprising, prior to establishing the communication protocol and prior to determining the at least one result corresponding to the verification requirement of the biometric verification process, activating a Near Field Communication (NFC) device independent of determining the at least one result corresponding to the verification requirement of the biometric verification process.

Clause 3: The method of Clause 1 or 2, further comprising, after activating the NFC device and prior to determining the at least one result corresponding to the verification requirement of the biometric verification process, automatically establishing, via the NFC device, an NFC link corresponding to the communication protocol between the portable payment device and the point-of-sale system.

Clause 4: The method of any of Clauses 1-3, wherein the biometric verification process comprises at least one verification requirement comprising at least one of the following: facial recognition, retina recognition, fingerprint recognition, voice recognition, or any combination thereof.

Clause 5: The method of any of Clauses 1-4, wherein the verification requirement of the alternate verification process comprises at least one of the following: user signature, issuer contact, alternate identification, a personal identification number, or any combination thereof.

Clause 6: The method of any of Clauses 1-5, further comprising: in response to determining a success result of the verification requirement of the biometric verification process, determining, with at least one processor, at least one transaction limitation parameter; determining, with at least one processor, transaction data corresponding to the transaction; and based upon the transaction data, and in response to determining that the at least one transaction limitation has been met, terminating, with at least one processor, the biometric verification process.

Clause 7: The method of any of Clauses 1-6, wherein the at least one transaction limitation comprises at least one of the following: a maximum transaction amount, a transaction count, cumulative transaction amount, a specified merchant limitation, a merchant category limitation, or any combination thereof.

Clause 8: The method of any of Clauses 1-7, wherein prior to determining the alternate verification process, the method comprises reinitiating, with at least one processor, the biometric verification process.

Clause 9: A portable payment device for use in a transaction at a point-of-sale system, comprising: at least one biometric sensor programmed or configured to determine biometric data; and at least one processor programmed or configured to: establish a communication protocol between the portable payment device and the point-of-sale system; based at least partially on the biometric data, determine at least one result corresponding to a verification requirement of the biometric verification process; in response to determining an absence result or a failure result of the verification requirement of the biometric verification process, determine an alternate verification process associated with the portable payment device; determine a verification requirement of the alternate verification process; and transmit the verification requirement of the alternate verification process to the point-of-sale system.

Clause 10: The portable payment device of Clause 9, wherein the portable payment device comprises at least one of the following: a portable electronic device, a mobile device, a financial instrument, a credit card, a debit card, a smart card, a prepaid card, or any combination thereof.

Clause 11: The portable payment device of Clause 9 or 10, wherein the portable payment device further comprises a Near Field Communication (NFC) device, wherein, prior to establishing the communication protocol and prior to determining the at least one result corresponding to the verification requirement of the biometric verification process, the NFC device is activated independent of determining the at least one result corresponding to the verification requirement of the biometric verification process.

Clause 12: The portable payment device of any of Clauses 9-11, wherein, after activating the NFC device and prior to determining the at least one result corresponding to the verification requirement of the biometric verification process, an NFC link corresponding to the communication protocol between the portable payment device and the point-of-sale system is automatically established via the NFC device.

Clause 13: The portable payment device of any of Clauses 9-12, wherein the biometric sensor comprises at least one of the following: a camera, a fingerprint sensor, a microphone, or any combination thereof, and wherein the biometric sensor is positioned on the portable payment device.

Clause 14: The portable payment device of any of Clauses 9-13, wherein the verification requirement of the alternate verification process comprises at least one of the following: user signature, issuer contact, alternate identification, a personal identification number, or any combination thereof.

Clause 15: The portable payment device of any of Clauses 9-14, the at least one processor further programmed or configured to: in response to determining a success result of the verification requirement of the biometric verification process, determine at least one transaction limitation parameter; determine transaction data corresponding to the transaction; and based upon the transaction data, and in response to determining that the at least one transaction limitation has been met, terminate the biometric verification process.

Clause 16: The portable payment device of any of Clauses 9-15, wherein prior to determining the alternate verification process, the at least one processor is programmed or configured to reinitiate the biometric verification process.

Clause 17: A computer program product for validating user credentials in a transaction at a point-of-sale system initiated with a portable payment device associated with a biometric verification process, comprising at least one non-transitory computer-readable medium including program instructions that, when executed by at least one processor, cause the at least one processor to: establish a communication protocol between the portable payment device and the point-of-sale system; based at least partially on biometric data, determine at least one result corresponding to verification requirement of the biometric verification process; in response to determining an absence result or a failure result of the verification requirement of the biometric verification process, determine an alternate verification process associated with the portable payment device; determine a verification requirement of the alternate verification process; and transmit the verification requirement of the alternate verification process to the point-of-sale system.

Clause 18: The computer program product of Clause 17, wherein the program instructions further comprise, prior to establishing the communication protocol and prior to determining the at least one result corresponding to the verification requirement of the biometric verification process, activating a Near Field Communication (NFC) device independent of determining the at least one result corresponding to the verification requirement of the biometric verification process.

Clause 19: The computer program product of Clause 17 or 18, wherein the program instructions further comprise, after activating the NFC device and prior to determining the at least one result corresponding to the verification requirement of the biometric verification process, automatically establishing, via the NFC device, an NFC link corresponding to the communication protocol between the portable payment device and the point-of-sale system.

Clause 20: The computer program product of any of Clauses 17-19, wherein the biometric verification process comprises at least one verification requirement comprising at least one of the following: facial recognition, retina recognition, fingerprint recognition, voice recognition, or any combination thereof.

Clause 21: The computer program product of any of Clauses 17-20, wherein the verification requirement of the alternate verification process comprises at least one of the following: user signature, issuer contact, alternate identification, a personal identification number, or any combination thereof.

Clause 22: The computer program product of any of Clauses 17-21, wherein the program instructions cause the at least one processor to: in response to determining a success result of the verification requirement of the biometric verification process, determine at least one transaction limitation parameter; determine transaction data corresponding to the transaction; and based upon the transaction data, and in response to determining that the at least one transaction limitation has been met, terminate the biometric verification process.

Clause 23: The computer program product of any of Clauses 17-22, wherein prior to determining the alternate verification process, the program instructions cause the at least one processor to reinitiate, with at least one processor, the biometric verification process.

BRIEF DESCRIPTION OF THE DRAWINGS

Additional advantages and details of the disclosure are explained in greater detail below with reference to the exemplary embodiments that are illustrated in the accompanying schematic figures, in which.

DESCRIPTION OF THE DISCLOSURE

Figure 1:
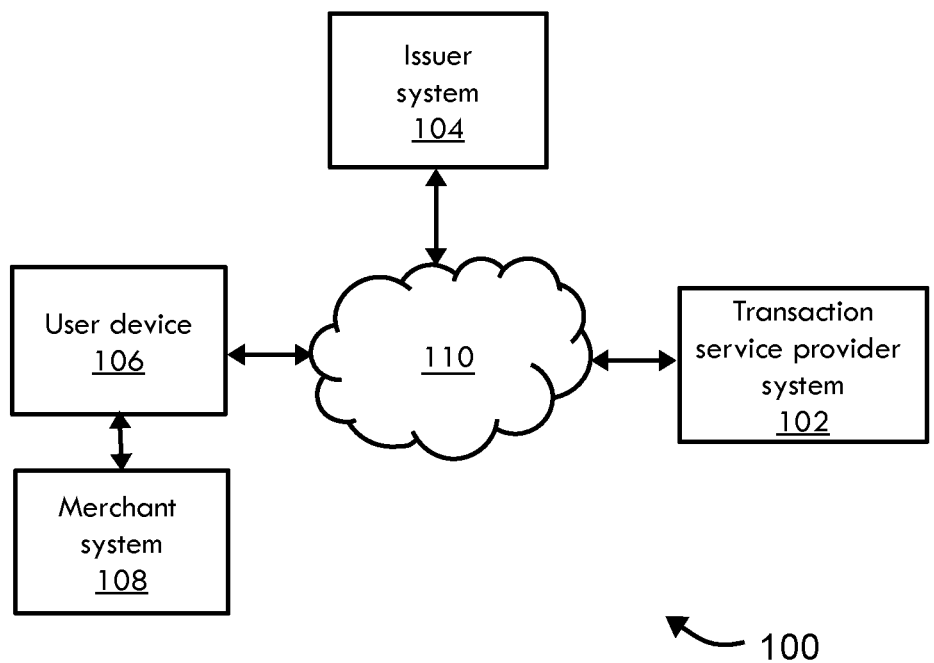
FIG. 1 is a diagram of some non-limiting embodiments or aspects of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" or "issuer" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. Further, any type of account identifier may be referred to as an "identification data element type" or "key identification data element type," while the content of the identifier may be referred to as an "identification data element value" or "key identification data element value."

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" or "electronic device" may refer to one or more portable electronic devices configured to communicate with one or more networks. As an example, a mobile device may include a cellular phone (e.g., a smartphone or standard cellular phone), a portable computer (e.g., a tablet computer, a laptop computer, and the like), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider. Further, any type of electronic wallet may be referred to as an "identification data element type" or "key identification data element type," while the content of the identifier may be referred to as an "identification data element value" or "key identification data element value."

As used herein, the term "portable payment device" may refer to a payment device, an electronic payment device, a payment card (e.g., a credit or debit card), a gift card, a smartcard, smart media, a payroll card, a healthcare card, a wrist band, a machine-readable medium containing account data, a keychain device or fob, an RFID transponder, a retailer discount or loyalty card, a mobile device executing an electronic wallet application, a personal digital assistant, a security card, an access card, a wireless terminal, and/or a transponder, as examples. The portable payment device may include a volatile or a non-volatile memory to store information, such as an account identifier or a name of the account holder. Further, the PAN may be referred to as an "identification data element value" or "key identification data element value."

The term "account data," as used herein, refers to any data concerning one or more accounts for one or more users. Account data may include, for example, one or more account identifiers, user identifiers, transaction histories, balances, credit limits, issuer institution identifiers, and/or the like.

A transaction message may be generated based on one or more transaction parameters from the transaction data, such as the transaction value, a transaction code, a merchant identifier (e.g., a unique merchant identifier, a merchant name, a merchant location, and/or the like), and/or other information concerning the transaction.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Non-limiting embodiments or aspects of the present disclosure are directed to a computer-implemented method, system, and computer program product for automatically generating an account profile for at least one user associated with a plurality of account identifiers. Non-limiting embodiments or aspects of the present disclosure provide an intelligent method and system to identify multiple directly or indirectly related accounts that are associated with a single user or a plurality of users, e.g., a household. Using only a single data point, e.g., a key identification data element value (e.g., a portable payment device number (or PAN), an identifier associated with a specific electronic device, an identifier associated with an electronic wallet, an identifier associate with a token, and the like), non-limiting embodiments or aspects of the present disclosure determine all potential accounts corresponding to or associated with the user or the household. By generating and managing the user's complete account portfolio, both the user and third parties, e.g., issuers, transaction service providers, merchants, and the like, have access to important information for engaging in technical and business decisions. Non-limiting embodiments or aspects of the present disclosure leverage the portfolio information in the user account profile for cardholder recurring billing management, transaction risk scoring, stand-in transaction processing, and consumer abnormal spending detection and analysis. In this way, the present disclosure allows users and households to more effectively manage their multiple accounts across multiple devices, and allows third parties to better serve the cardholder and protect against liability associated with fraud.

Referring now to FIG. 1, FIG. 1 is a diagram of an example environment 100 in which devices, systems, and/or methods, described herein, may be implemented. As shown in FIG. 1, environment 100 includes a transaction service provider system 102, an issuer system 104, a user device 106, a merchant system 108, and a network 110. Transaction service provider system 102, issuer system 104, user device 106, and/or merchant system 108 may interconnect (e.g., establish a connection to communicate) via wired connections, wireless connections, or a combination of wired and wireless connections.

Transaction service provider system 102 may include one or more devices capable of receiving information from issuer system 104, user device 106, and/or merchant system 108 via network 110 and/or communicating information to issuer system 104, user device 106, and/or merchant system 108 via network 110. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to the transaction service provider system 102. In some non-limiting embodiments or aspects, transaction service provider system 102 may be capable of receiving information from, storing information in, communicating information to, or searching information stored in a data storage device.

Issuer system 104 may include one or more devices capable of receiving information from transaction service provider system 102 and/or user device 106 via a network (e.g., network 110) and/or communicating information to transaction service provider system 102, user device 106, and/or merchant system 108 via the network. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, and/or merchant system 108, via network 110. For example, user device 106 may include a client device and/or the like. In some non-limiting embodiments or aspects, user device 106 may or may not be capable of receiving information (e.g., from merchant system 108) via a short range wireless communication connection (e.g., an NFC communication connection, an RFID communication connection, a Bluetooth® communication connection, and/or the like), and/or communicating information (e.g., to merchant system 108) via a short range wireless communication connection.

Merchant system 108 may include one or more devices capable of receiving information from transaction service provider system 102, issuer system 104, and/or user device 106 via network 110 and/or communicating information to transaction service provider system 102, issuer system 104, and/or user device 106 via network 110. Merchant system 108 may also include a device capable of receiving information from user device 106 via network 110, a communication connection (e.g., an NFC communication connection, an RFID communication connection, a Bluetooth® communication connection, and/or the like) with user device 106, and/or the like, and/or communicating information to user device 106 via the network, the communication connection, and/or the like. For example, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more user devices 106. For example, merchant system 108 may include user device 106 which allows a merchant to communicate information to transaction service provider system 102. In some non-limiting embodiments or aspects, merchant system 108 may include one or more devices, such as computers, computer systems, and/or peripheral devices capable of being used by a merchant to conduct a payment transaction with a user. For example, merchant system 108 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
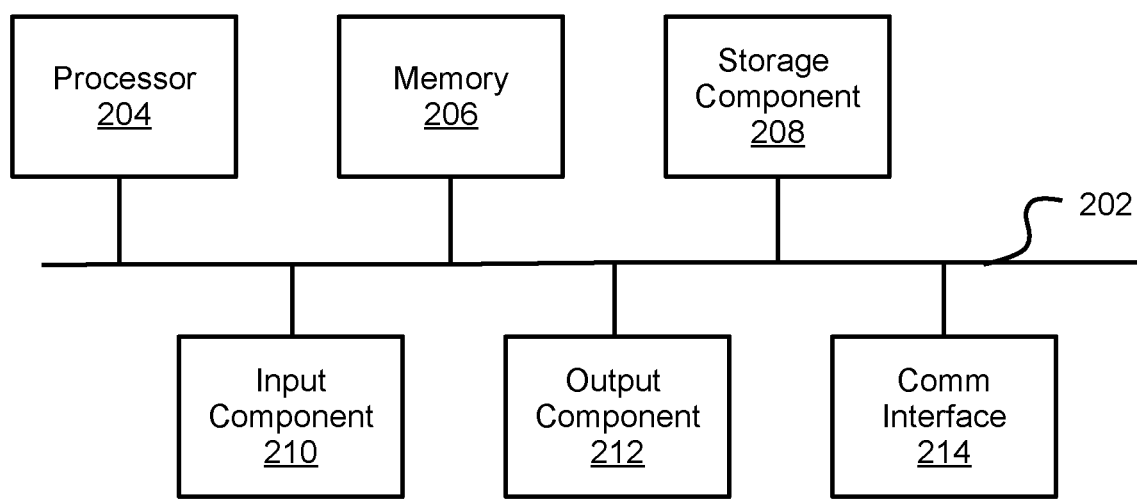
FIG. 2 is a diagram of some non-limiting embodiments or aspects of components of one or more devices of FIG. 1.

Referring now to FIG. 2, FIG. 2 is a diagram of example components of a device 200. Device 200 may correspond to one or more devices of transaction service provider system 102, and/or one or more devices of issuer system 104, user device 106, and/or merchant system 108. In some non-limiting embodiments or aspects, transaction service provider system 102, issuer system 104, user device 106, and/or merchant system 108 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
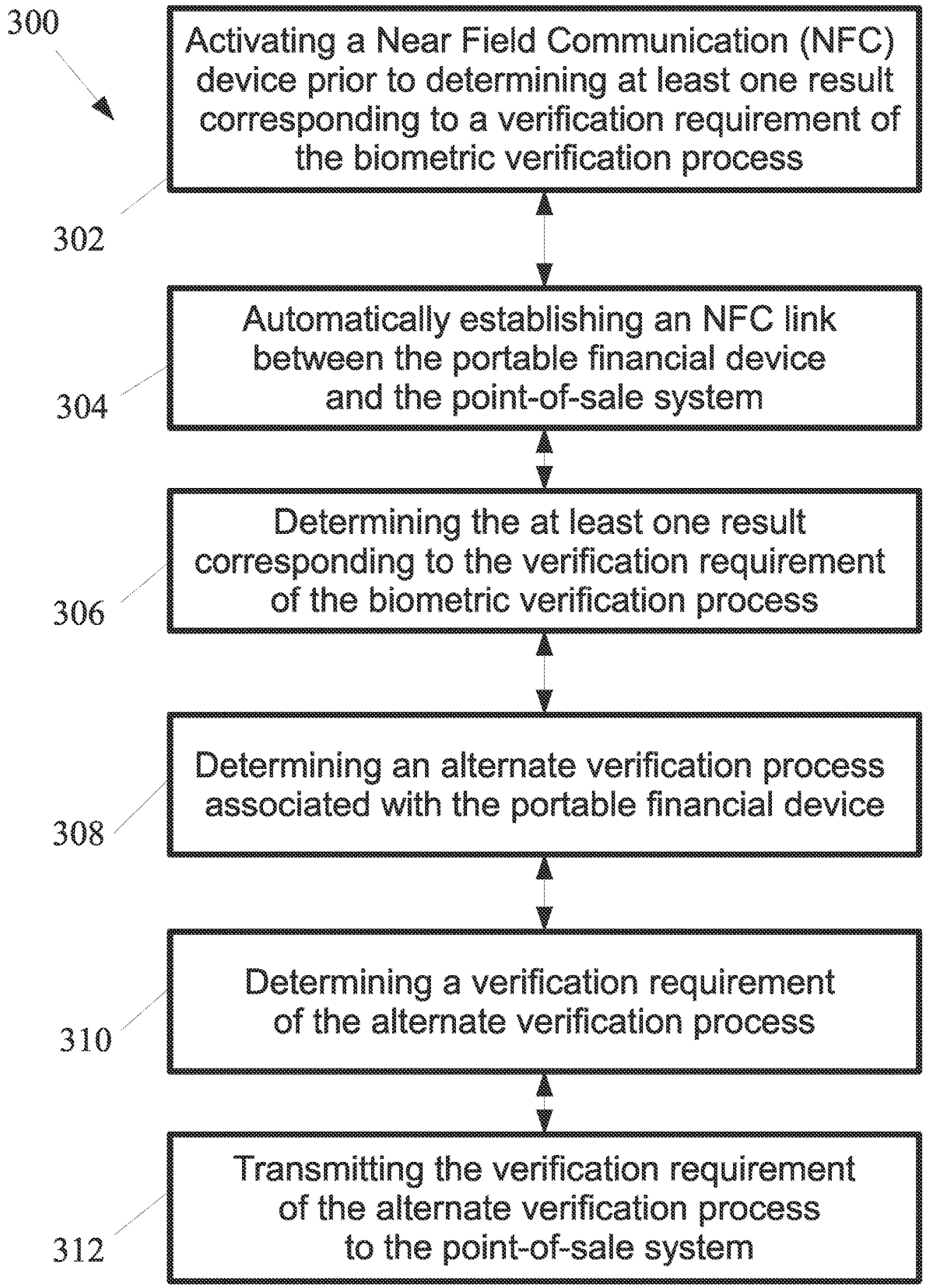
FIG. 3 is a flowchart of some non-limiting embodiments or aspects of a system and method for biometric fallback authentication.

With reference to FIG. 3, FIG. 3 is a flowchart of some non-limiting embodiments or aspects of a process 300 for validating user credentials in a transaction at a point-of-sale system initiated with a portable payment device associated with a biometric verification process. In some non-limiting embodiments or aspects, one or more of the steps of process 300 may be performed (e.g., completely, partially, etc.) by the transaction service provider system 102 (e.g., one or more devices of transaction service provider system 102). In some non-limiting embodiments or aspects, the process 300 may be performed by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 3, at step 302, process 300 includes activating a Near Field Communication (NFC) device prior to determining at least one result corresponding to a verification requirement of the biometric verification process. At step 304, an NFC link between the portable payment device and the point-of-sale (POS) system is automatically established via the NFC device. At step 306, the at least one result corresponding to the verification requirement of the biometric verification process is determined by the least one processor. At step 308, in response to determining an absence result or a failure result of the verification requirement of the biometric verification process, the at least one processor determines an alternate verification process associated with the portable payment device. At step 310, the at least one processor determines a verification requirement of the alternate verification process. At step 312, the NFC device transmits the verification requirement of the alternate verification process to the point-of-sale system.

In some non-limiting embodiments or aspects, the process 300 includes activating the NFC device independently of determining the at least one result corresponding to the verification requirement of the biometric verification process. In some non-limiting embodiments or aspects, the biometric verification process may include at least one verification requirement including at least one of: facial recognition, retina recognition, fingerprint recognition, voice recognition, or any combination thereof. In some non-limiting embodiments or aspects, the verification requirement of the alternate verification process includes at least one of the following: a user signature, an issuer contact, an alternate identification, a personal identification number (including an online PIN or an offline PIN), or any combination thereof.

In some non-limiting embodiments or aspects, the process 300 may further include, in response to determining a success result of the verification requirement of the biometric verification process, determining, with at least one processor, at least one transaction limitation parameter. In some non-limiting embodiments or aspects, the at least one transaction limitation includes at least one of the following: a maximum transaction amount, a transaction count, cumulative transaction amount, a specified merchant limitation, a merchant category limitation, or any combination thereof. Once the at least one transaction limitation parameter has been determined, the at least one processor determines transaction data corresponding to the transaction. Based upon the transaction data, and in response to determining that the at least one transaction limitation has been met, the at least one processor will terminate the biometric verification process.

In some non-limiting embodiments or aspects, prior to determining the alternate verification process, the process 300 includes reinitiating, with the at least one processor, the biometric verification process.

Using process 300, unlike the "gated" or "on/off" configuration of current portable payment devices, the NFC device of the portable payment device or the POS terminal of the present disclosure is always activated. Therefore, the payment feature of the portable payment device is always activated.

In some non-limiting embodiments or aspects, a portable payment device for use in the transaction at the point-of-sale system includes at least one biometric sensor programmed or configured to determine biometric data, an NFC device programmed or configured to transmit data, and at least one processor programmed or configured to perform at least one step of process 300. The biometric sensor may be a camera, a fingerprint sensor, a microphone, or any combination thereof.

In some non-limiting embodiments or aspects, the portable payment device is a credit card or debit card issued by a financial institution. It is also contemplated that the portable payment device may be a prepaid card. The credit card or debit card may include a biometric sensor thereon to conduct a biometric verification process. The biometric sensor provided on the credit card or debit card is different from a biometric sensor that is provided on a user's phone or a POS terminal, which requires the POS terminal to perform the biometric verification. In some non-limiting embodiments or aspects of the process 300, the user will insert the credit card or debit card into the POS terminal and then perform the biometric verification on the credit card or debit card using the biometric sensor. In the event the biometric verification is accepted by the biometric sensor, the transaction at the POS terminal is initiated. In the event the biometric verification is not accepted by the biometric sensor, a "fallback" or alternative verification is presented on the POS terminal to permit the user to use a different type of verification to initiate the transaction on the POS terminal.

In some non-limiting embodiments or aspects, on a portable payment device there is a division of labor between a payment application and a biometric verification application. In some non-limiting embodiments or aspects, the payment application and the biometric verification application are implemented as two separate applications. In some non-limiting embodiments or aspects, the payment application and the biometric verification application are implemented as one application combining both functionalities. The payment application manages the interactions between the credit card or debit card and the POS terminal. The biometric verification application enrolls biometric templates, contains biometric reference templates, performs the biometric verification, and informs the payment application of the biometric verification results.

In some non-limiting embodiments or aspects, the payment application will request and check the biometric verification on the portable payment device by communicating with the biometric verification application. In the event the biometric verification outcome is successful, the payment application will send a transaction response to the POS terminal indicating no cardholder verification method (CVM) is required to perform the transaction. The message may be signed by the portable payment device and verified by the POS terminal. In some non-limiting embodiments or aspects, the message is a CVM list for contact chip transactions or card transaction qualifiers for contactless chip transactions. The issuer of the portable payment device can optionally set at least one threshold in the payment application to limit the maximum transaction amount, counts of transaction numbers, or maximum accumulated transaction amounts for transactions with successful biometric verification. In the event the biometric verification fails, the payment application may trigger a biometric verification retry option according to an issuer setting, such as a maximum number of retries permitted per transaction. In the event the biometric verification fails and the issuer set retry limit is exceeded or the issuer does not permit biometric verification retry options or the user does not activate or disable biometric verification on the portable payment device, the payment application may request the POS terminal to perform "fallback" CVM set by the issuer, by sending a message to the POS terminal. To activate the "fallback" CVM, a message is sent by the payment application to the POS terminal. The "fallback" CVM may include at least one of the following: an online PIN, an offline PIN, and a user signature.

Figure 4:
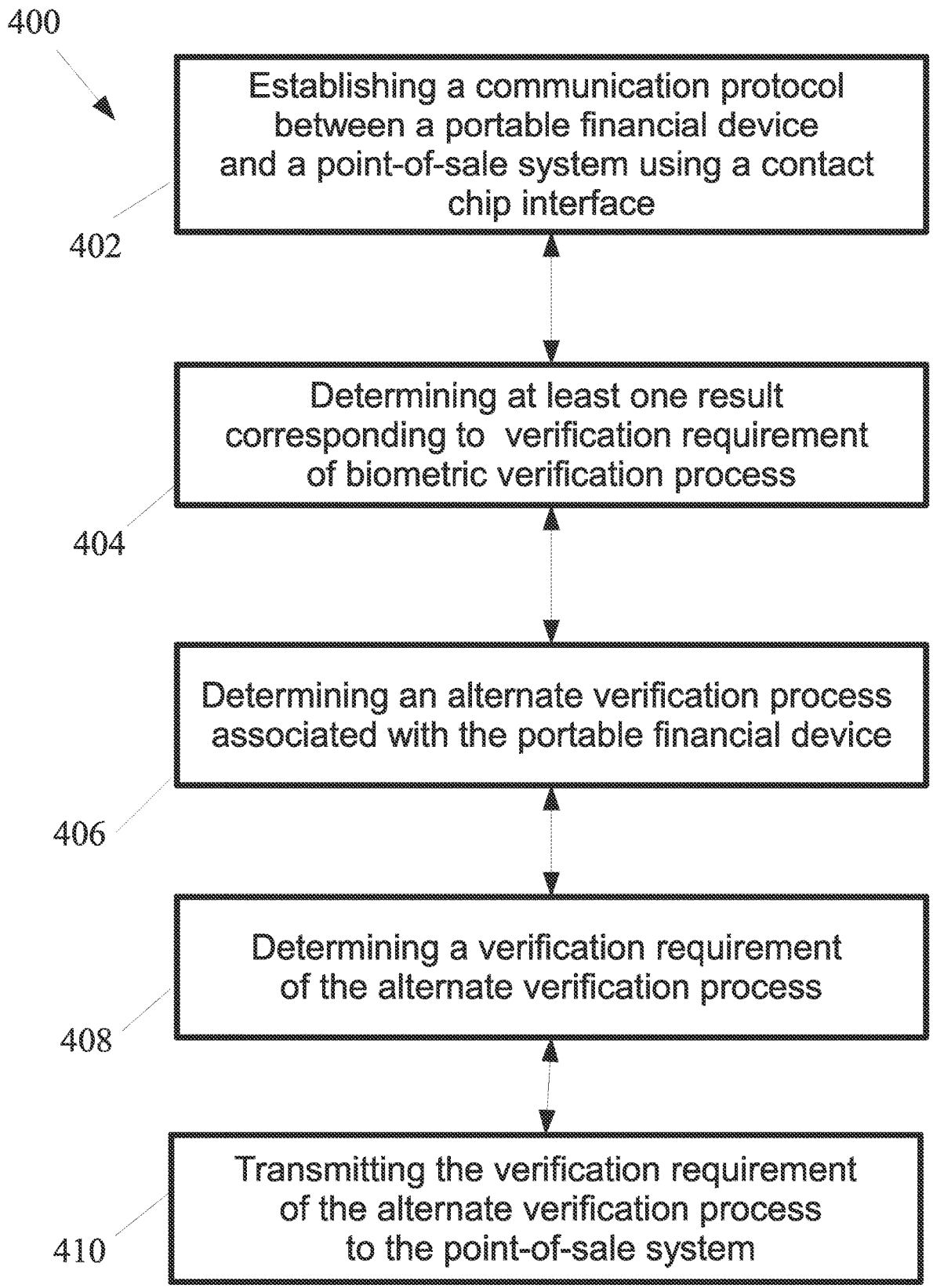
FIG. 4 is a flow chart of some non-limiting embodiments or aspects of a system and method for biometric fallback authentication.

With reference to FIG. 4, FIG. 4 is a flowchart of some non-limiting embodiments or aspects of a process 400 for validating user credentials in a transaction at a point-of-sale system initiated with a portable payment device associated with a biometric verification process. In some non-limiting embodiments or aspects, one or more of the steps of process 400 may be performed (e.g., completely, partially, etc.) by the transaction service provider system 102 (e.g., one or more devices of transaction service provider system 102). In some non-limiting embodiments or aspects, the process 400 may be performed by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 4, at step 402, process 400 includes establishing a communication link between the portable payment device and the POS system prior to determining at least one result corresponding to a verification requirement of the biometric verification process. In some non-limiting embodiments or aspects, process 400 may include activating the communication protocol supported by the portable payment device, such as a contact chip communication protocol, Bluetooth®, infrared, or ultrasound. In some non-limiting embodiments or aspects, a communication chip on the portable payment device is moved by a user to be inserted into an interface on the POS system to establish the communication protocol. In some non-limiting embodiments or aspects, in order to establish the communication protocol, an answer-to-reset protocol is initiated to establish communication between the portable payment device and the POS system. At step 404, the at least one result corresponding to the verification requirement of the biometric verification process is determined by the least one processor. At step 406, in response to determining an absence result or a failure result of the verification requirement of the biometric verification process, the at least one processor determines an alternate verification process associated with the portable payment device. At step 408, the at least one processor determines a verification requirement of the alternate verification process. At step 410, the point-of-sale system assesses and validates the verification requirement of the alternate verification process.

In some non-limiting embodiments or aspects, the biometric verification process may include at least one verification requirement including at least one of: facial recognition, retina recognition, fingerprint recognition, voice recognition, or any combination thereof. In some non-limiting embodiments or aspects, the verification requirement of the alternate verification process includes at least one of the following: a user signature, an issuer contact, an alternate identification, a personal identification number (including an online PIN or an offline PIN), or any combination thereof.

In some non-limiting embodiments or aspects, the process 400 may further include, in response to determining a success result of the verification requirement of the biometric verification process, determining, with at least one processor, at least one transaction limitation parameter. In some non-limiting embodiments or aspects, the at least one transaction limitation includes at least one of the following: a maximum transaction amount, a transaction count, cumulative transaction amount, a specified merchant limitation, a merchant category limitation, or any combination thereof. Once the at least one transaction limitation parameter has been determined, the at least one processor determines transaction data corresponding to the transaction. Based upon the transaction data, and in response to determining that the at least one transaction limitation has been met, the at least one processor will terminate the biometric verification process.

In some non-limiting embodiments or aspects, prior to determining the alternate verification process, the process 400 includes reinitiating, with the at least one processor, the biometric verification process.

Using process 400, unlike the "gated" or "on/off" configuration of current portable payment devices, the POS terminal of the present disclosure is always activated. Therefore, the payment feature of the portable payment device is always activated.

In some non-limiting embodiments or aspects, the portable payment device for use in the transaction at the point-of-sale system includes at least one biometric sensor programmed or configured to determine biometric data, and a contact chip programmed or configured to perform at least one step of process 400. The biometric sensor may be a fingerprint sensor.

In some non-limiting embodiments or aspects, the portable payment device is a credit card or debit card issued by a financial institution. It is also contemplated that the portable payment device may be a prepaid card. The credit card or debit card may include a biometric sensor thereon to conduct a biometric verification process. The biometric sensor provided on the credit card or debit card is different from a biometric sensor that is provided on a user's phone or a POS terminal, which requires the POS terminal to perform the biometric verification. In some non-limiting embodiments or aspects of the process 400, the user will insert the credit card or debit card into the POS terminal and then perform the biometric verification on the credit card or debit card using the biometric sensor. In the event the biometric verification is accepted by the biometric sensor, the transaction at the POS terminal is initiated. In the event the biometric verification is not accepted by the biometric sensor, a "fallback" or alternative verification is presented on the POS terminal to permit the user to use a different type of verification to initiate the transaction on the POS terminal.

In some non-limiting embodiments or aspects, on a portable payment device, there is a division of labor between a payment application and a biometric verification application. In some non-limiting embodiments or aspects, the payment application and the biometric verification application are implemented as two separate applications. In some non-limiting embodiments or aspects, the payment application and the biometric verification application may be implemented as one application combining both functionalities. The payment application may manage the interactions between the credit card or debit card and the POS terminal. The biometric verification application enrolls biometric templates, contains biometric reference templates, performs the biometric verification, and informs the payment application of the biometric verification results.

In some non-limiting embodiments or aspects, the payment application will request and check the biometric verification on the portable payment device by communicating with the biometric verification application. In the event the biometric verification outcome is successful, the payment application will communicate a transaction response to the POS terminal indicating no cardholder verification method (CVM) is required to perform the transaction. The message may be signed by the portable payment device and verified by the POS terminal. In some non-limiting embodiments or aspects, the message is a CVM list for contact chip transactions or card transaction qualifiers for contactless chip transactions. The issuer of the portable payment device can optionally set at least one threshold in the payment application to limit the maximum transaction amount, counts of transaction numbers, or maximum accumulated transaction amounts for transactions with successful biometric verification. In the event the biometric verification fails, the payment application may trigger a biometric verification retry option according to an issuer setting, such as a maximum number of retrys permitted per transaction. In the event the biometric verification fails and the issuer set retry limit is exceeded or the issuer does not permit biometric verification retry options or the user does not activate or disable biometric verification on the portable payment device, the payment application may request the POS terminal to perform "fallback" CVM set by the issuer, by sending a message to the POS terminal. To activate the "fallback" CVM, a message is sent by the payment application to the POS terminal. The "fallback" CVM may include at least one of the following: an online PIN, an offline PIN, and a user signature.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for validating user credentials in a payment transaction between a user and a merchant at a point-of-sale system initiated with a portable payment device associated with a biometric verification process, the method comprising:

activating a Near Field Communication (NFC) device independent of determining a result corresponding to a verification requirement of the biometric verification process, wherein the biometric verification process comprises the user submitting a biometric input;

after activating the NFC device, automatically establishing, via the NFC device, an NFC link between the portable payment device and the point-of-sale system for conducting the payment transaction;

after establishing the NFC link, determining, with at least one processor, that the result corresponding to the verification requirement of the biometric verification process comprises a verification success based on the biometric input;

in response to determining that the result comprises the verification success, determining, with at least one processor, at least one transaction limitation parameter;

determining, with at least one processor, transaction data corresponding to the payment transaction;

based upon the transaction data, determining, with at least one processor, whether the at least one transaction limitation parameter has been met;

in response to determining that the at least one transaction limitation parameter has been met, terminating, with at least one processor, the biometric verification process; and after terminating the biometric verification process, processing the payment transaction, with at least one processor, based on the verification success by completing the payment transaction with the point-of-sale system.

2. The method of claim 1, wherein the at least one transaction limitation parameter comprises at least one of the following: a maximum transaction amount, a transaction count, a cumulative transaction amount, a specified merchant limitation, a merchant category limitation, or any combination thereof.

3. The method of claim 1, further comprising: in response to determining that the at least one transaction limitation parameter has not been met:

automatically transmitting a transaction message to the point-of-sale system via the NFC link indicating that no cardholder verification method is required to perform the payment transaction; and completing processing of the payment transaction without executing a cardholder verification method.

4. The method of claim 3, wherein the transaction message is digitally signed by the portable payment device with a digital signature, and wherein the digital signature is verified by the point-of-sale system.

5. The method of claim 1, wherein the biometric verification process comprises at least one verification requirement comprising at least one of the following: facial recognition, retina recognition, fingerprint recognition, voice recognition, or any combination thereof.

6. The method of claim 1, wherein the portable payment device comprises a biometric sensor, and wherein the user co-acts with the biometric sensor during the biometric verification process to submit the biometric input.

7. The method of claim 6, wherein the portable payment device comprises a credit card or a debit card, and wherein the biometric sensor is arranged on the credit card or the debit card.

8. A system for validating user credentials in a payment transaction between a user and a merchant at a point-of-sale system initiated with a portable payment device associated with a biometric verification process, the system comprising at least one processor programmed or configured to:

activate a Near Field Communication (NFC) device independent of determining a result corresponding to a verification requirement of the biometric verification process, wherein the biometric verification process comprises the user submitting a biometric input;

after activating the NFC device, automatically establish, via the NFC device, an NFC link between the portable payment device and the point-of-sale system for conducting the payment transaction;

after establishing the NFC link, determine that the result corresponding to the verification requirement of the biometric verification process comprises a verification success based on the biometric input;

in response to determining that the result comprises the verification success, determine at least one transaction limitation parameter;

determine transaction data corresponding to the payment transaction;

based upon the transaction data, determine whether the at least one transaction limitation parameter has been met;

in response to determining that the at least one transaction limitation parameter has been met, terminate the biometric verification process; and after terminating the biometric verification process, process the payment transaction based on the verification success by completing the payment transaction with the point-of-sale system.

9. The system of claim 8, wherein the at least one transaction limitation parameter comprises at least one of the following: a maximum transaction amount, a transaction count, a cumulative transaction amount, a specified merchant limitation, a merchant category limitation, or any combination thereof.

10. The system of claim 8, wherein in response to determining that the at least one transaction limitation parameter has not been met, the at least one processor is programmed of configured to:

automatically transmit a transaction message to the point-of-sale system via the NFC link indicating that no cardholder verification method is required to perform the transaction; and complete processing of the payment transaction without executing a cardholder verification method.

11. The system of claim 10, wherein the transaction message is digitally signed by the portable payment device with a digital signature, and wherein the digital signature is verified by the point-of-sale system.

12. The system of claim 8, wherein the biometric verification process comprises at least one verification requirement comprising at least one of the following: facial recognition, retina recognition, fingerprint recognition, voice recognition, or any combination thereof.

13. The system of claim 8, wherein the portable payment device comprises a biometric sensor, and wherein the user co-acts with the biometric sensor during the biometric verification process to submit the biometric input.

14. A computer program product for validating user credentials in a payment transaction between a user and a merchant at a point-of-sale system initiated with a portable payment device associated with a biometric verification process, comprising at least one non-transitory computer-readable medium including program instructions that, when executed by at least one processor, cause the at least one processor to:

activate a Near Field Communication (NFC) device independent of determining a result corresponding to a verification requirement of the biometric verification process, wherein the biometric verification process comprises the user submitting a biometric input;

after activating the NFC device, automatically establish, via the NFC device, an NFC link between the portable payment device and the point-of-sale system for conducting the payment transaction;

after establishing the NFC link, determine that the result corresponding to the verification requirement of the biometric verification process comprises a verification success based on the biometric input;

in response to determining that the result comprises the verification success, determine at least one transaction limitation parameter;

determine transaction data corresponding to the payment transaction;

based upon the transaction data, determine whether the at least one transaction limitation parameter has been met;

in response to determining that the at least one transaction limitation parameter has been met, terminate the biometric verification process; and after terminating the biometric verification process, process the payment transaction based on the verification success by completing the payment transaction with the point-of-sale system.

\* \* \* \* \*